Patented Dec. 8, 1936

2,063,191

UNITED STATES PATENT OFFICE 2,063,191

HYDROXY PHENYL MORPHOLINES

Horace B. Pray, Wilmington, Del., assignor to E. I. du Pont de Nemours & Company, Wilmington, Del., a corporation of Delaware No Drawing. Application May 18, 1933, Serial No. 671,776

3 Claims. (Cl. 260—28)

This invention relates to morpholine derivatives, more particularly morpholine compounds substituted by hydrocarbon or substituted hydrocarbon groups on the nitrogen atom, and a process for the production thereof.

Certain morpholine derivatives have been prepared by the reaction of beta:beta'-dichloro-diethyl ether with primary aromatic amines in the presence of an alkali metal hydroxide. Thus, N-phenyl morpholine has been prepared directly from aniline by refluxing the mixture in the presence of a 10% sodium hydroxide solution. A number of N-substituted morpholines have been prepared by modifications of this method. Using a 35% solution of sodium hydroxide, a 35% yield of N-phenyl morpholine has been obtained. Various other methods of preparing similar morpholine derivatives have been proposed but, in general, they leave much to be desired from the standpoint of commercial application on account of the fact that, in many cases, the products obtained are relatively impure, a number of costly and expensive steps are involved, or the reaction takes place only with difficulty because of the formation of by-products. For example, the reaction of para-aminophenol with beta-beta'-dichloro-diethyl ether in the presence of an alkali metal hydroxide gives rise to tarry and colored by-products. Furthermore, the yields are low.

It is an object of the present invention to produce certain new and improved N-substituted morpholines. A further object is the production of morpholine derivatives in a high state of said purity. Other objects will appear hereinafter.

These objects are accomplished according to this invention whereby new and useful morpholine compounds are produced by reacting together a beta:beta'-dihalogen alkyl ether and certain primary aminophenols in the presence of a mild inorganic base, and preferably in the presence of a diluent.

While the invention is susceptible to considerable variation and modification in the manner of its practical application, particularly as regards the character of the reactants, the proportions of materials, the conditions of reaction and the exact method of procedure, the following examples, in which the parts are by weight, will serve to illustrate how the invention may be practised.

Example I

A mixture consisting of 184 parts of 2-methyl-4-aminophenol, 214 parts of beta:beta'-dichloro-diethyl ether, 500 parts of water and 64 parts of magnesium oxide was charged into an iron reaction vessel equipped with an agitator. The reaction mixture was heated in the reaction vessel to a temperature of 145° C. to 150° C. for about fourteen hours, the maximum pressure being about 85 pounds per square inch. The charge was then cooled to room temperature and the solid product was recovered by filtration. The crude product thus isolated was dried and purified by re-crystallization from benzene. The resultant product was 3-methyl-4-hydroxy-N-phenyl morpholine, which is apparently a new compound having a melting point of about 115° C. to 116° C.

Example II

A reaction vessel similar to those used in the previous examples was charged with a mixture consisting of 184 parts of 3-methyl-4-aminophenol, 214 parts of beta:beta'-dichloro-diethyl ether, 500 parts of water and 64 parts of magnesium oxide. The temperature was maintained at about 140° C. to 145° C. for about sixteen hours, the maximum pressure being about 65 pounds per square inch. The product was recovered as described in Example I. This product was found to be 2-methyl-4-hydroxy-N-phenyl morpholine, which is apparently a new compound having a melting point of 131° C. to 132° C.

Instead of beta:beta'-dichloro-diethyl ether, the reaction with the amine may be effected with other dihalogen ethers such as, for example, symmetrical dichloro-di-isopropyl ether. The dihalogen alkyl ethers contemplated by the invention include also the dibrom- and di-iodo-ethers since, in reactions of this type, the bromine and iodine compounds usually react more readily than the corresponding chloro compound.

The expression "mild inorganic base" is intended to include and to cover the salts of strong bases with weak acids and the oxides and hydroxides of weak bases. Among the mild inorganic bases which may be employed are calcium oxide, calcium hydroxide, magnesium oxide, magnesium hydroxide, zinc oxide, zinc hydroxide, alkali metal carbonates, alkali metal bicarbonates, alkali metal borates, dialkali metal phosphates, (e. g., di-sodium phosphate), trialkali metal phosphates (e. g., tri-sodium phosphate), alkali metal acetates, alkaline earth metal carbonates, alkaline earth metal borates, alkaline earth metal acetates, zinc carbonate, zinc borate, zinc acetate, magnesium carbonate, magnesium borate and magnesium acetate.

The temperatures may vary within relatively wide limits. It has been found that when beta:beta'-dichloro-diethyl ether is heated with solutions of strong alkalis such as sodium or potassium hydroxide in accordance with the prior art processes, even at temperatures below 100° C., the ether is hydrolyzed to a considerable extent to diethylene glycol. The substitution of a mild inorganic base for the strong alkali greatly reduces the hydrolysis of the chloro-ether at these temperatures, but the reaction of the chloro-ethers with the amines becomes very slow. However, by carrying out the reaction in liquid phase in the presence of a mild inorganic base at temperatures above 100° C., the desired reaction of the chloro-ether with the amines is greatly accelerated without unduly increasing the hydrolysis of the chloro-ether. The upper temperature limit should preferably be below the temperature giving rise to the formation of decomposition products. In general, temperatures between about 100° C. and 200° C. have given satisfactory results. The optimum temperature range for the production of the compounds described in the examples is about 140° C. to about 160° C.

The pressure of the reaction is subject to considerable variation but is preferably sufficient to maintain the liquid phase under the temperature conditions employed. Normally, it is preferable to carry out the reaction in a closed vessel under the autogenous pressure of the reaction mixture. Where the mild inorganic base employed is a carbonate, relatively high pressures may be developed due to the formation of carbon dioxide.

The proportions of the various materials may vary widely depending largely upon the products desired. Generally speaking, it is preferable to employ approximately one mole of beta:beta'-dihalogen alkyl ether for each mole of amine, since a substantial excess of either the amine or the dihalogen alkyl ether may cause difficulty in the purification of the product. The amount of mild inorganic base to be used should preferably be sufficient to combine with all of the hydrogen halide liberated in order to prevent coloration and to allow the reaction to go to completion. An excess, although not harmful to the reaction, normally increases the difficulties of purifying the product. In general, therefore, it is preferable to use only a slight excess above the theoretical amount.

The quantity of diluent which may be added to the reaction mixture is variable and depends upon such factors as the solubility of the amine and the desired fluidity of the reaction mixture. In place of water diluents, such as, for example, benzene and toluene, may be employed. The use of water as a diluent in the production of phenolic compounds is desirable on account of its solvent action on many of these compounds.

The products of the invention are valuable as acid inhibitors, corrosion inhibitors, rubber antioxidants and dyestuff intermediates. The process provides a method of producing these products on a commercial scale in higher yields than heretofore obtainable commercially. The products are also obtained in a high state of purity and are easily recovered from the reaction mixture. Furthermore, as already pointed out, it is possible, by means of the present invention, to obtain products which were difficultly obtainable by prior art methods and, in many cases, were produced only in negligible amounts.

As many apparently widely different embodiments of this invention may be made without departing from the spirit and scope thereof, it is to be understood that I do not limit myself to the specific embodiments thereof except as defined in the following claims.

I claim:

1. The compound 3-methyl-4-hydroxy-N-phenyl morpholine, which melts at about 115° C.

2. The compound 2-methyl-4-hydroxy-N-phenyl morpholine, which melts at about 131° C.

3. Compounds having the formula

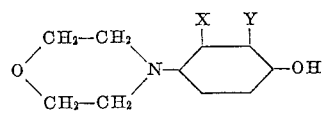

where one of the radicals X and Y is —CH₃, the other being hydrogen.

HORACE B. PRAY.